(No Model.) 2 Sheets—Sheet 1.
S. L. ALLEN.
SEED PLANTER AND FERTILIZER DISTRIBUTER.
No. 509,856. Patented Dec. 5, 1893.
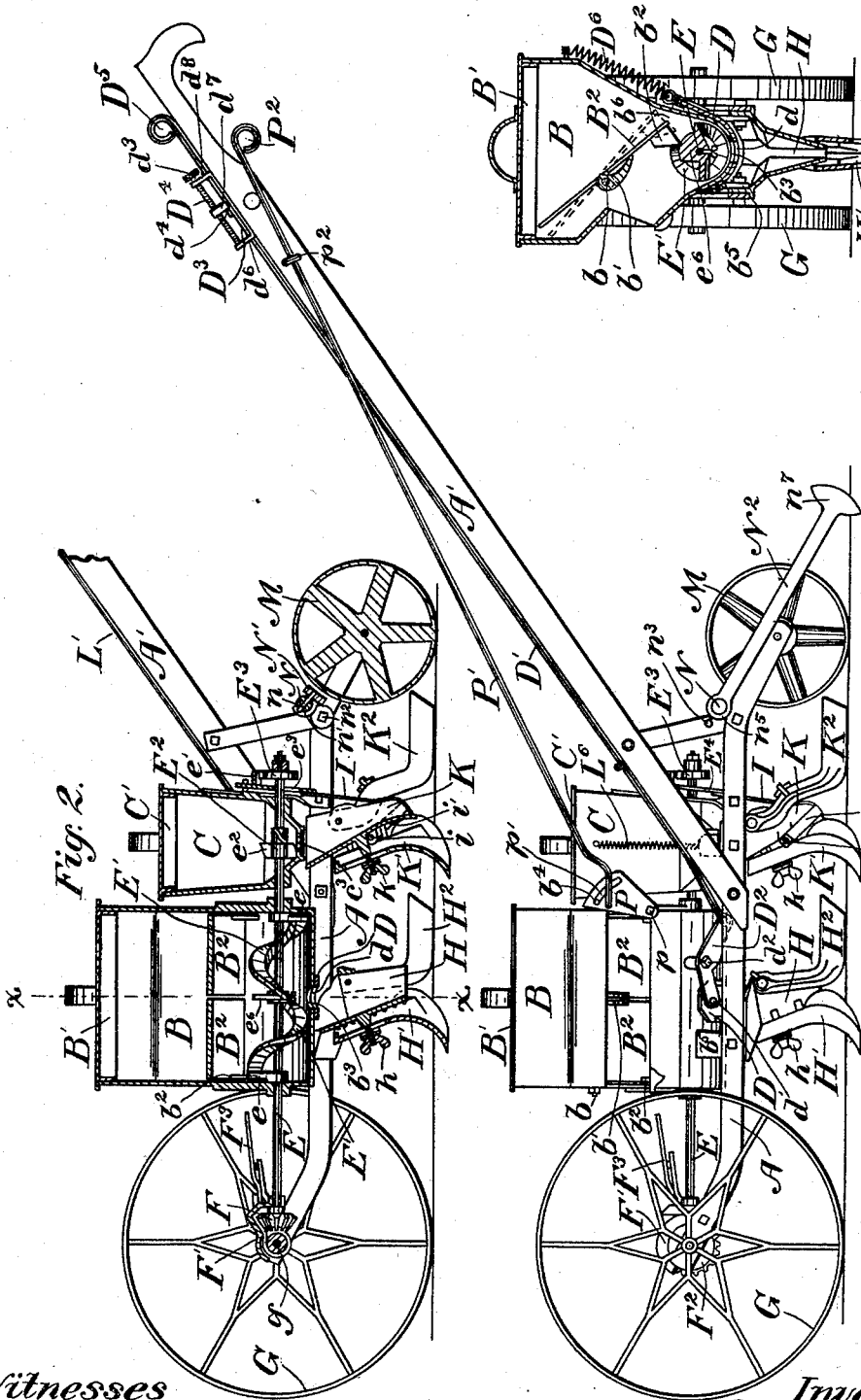

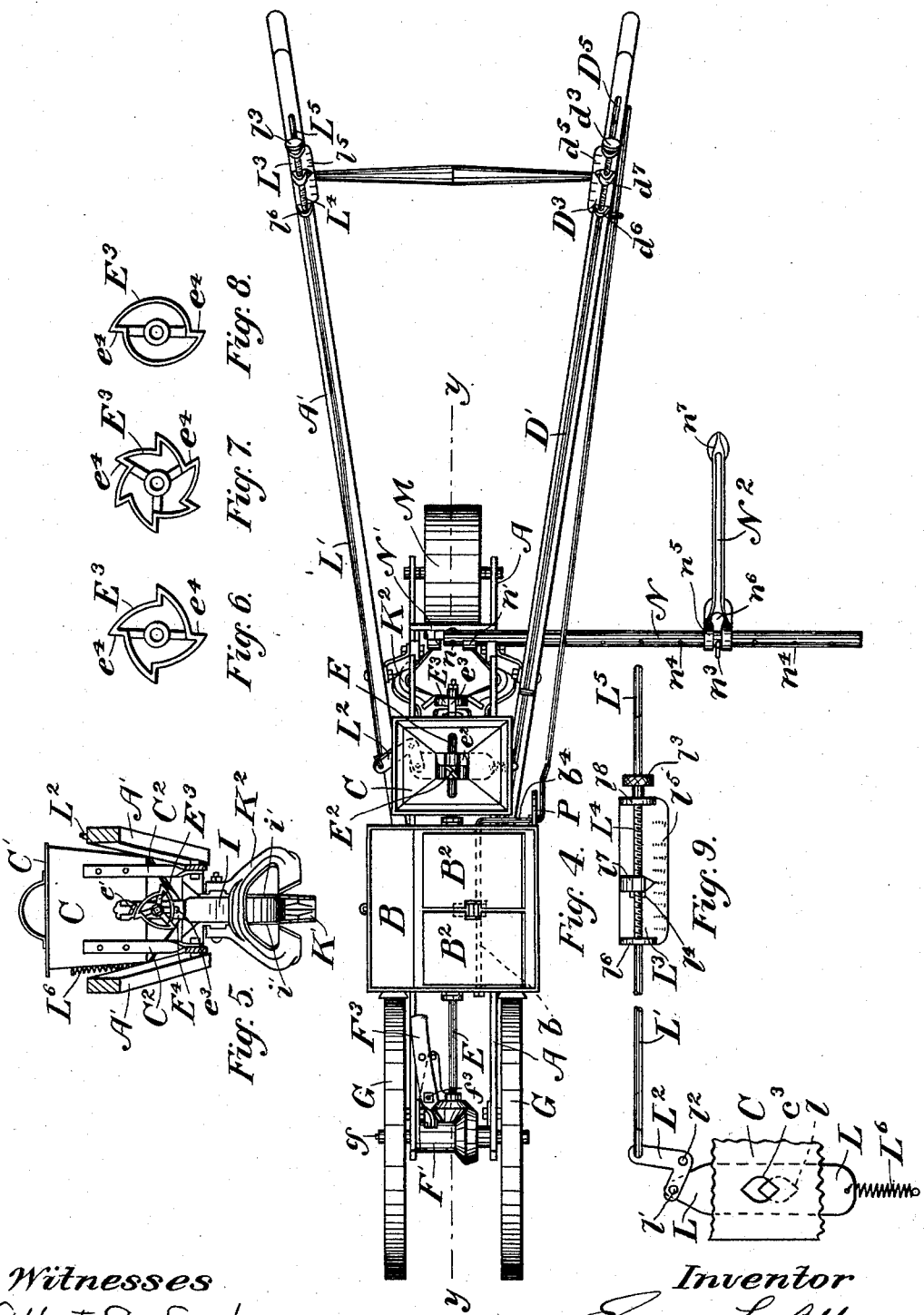

UNITED STATES PATENT OFFICE.

SAMUEL L. ALLEN, OF CINNAMINSON, NEW JERSEY.

SEED-PLANTER AND FERTILIZER-DISTRIBUTER.

SPECIFICATION forming part of Letters Patent No. 509,856, dated December 5, 1893.

Application filed December 31, 1891. Serial No. 416,643. (No model.)

*To all whom it may concern:*

Be it known that I, SAMUEL L. ALLEN, a citizen of the United States, residing at Cinnaminson, in the county of Burlington and State of New Jersey, have invented a new and Improved Combined Seed-Planter and Fertilizer-Dropper, of which the following is a full specification.

My invention consists of an improved implement for fertilizing the ground and sowing the seed at one operation, or separately, both fertilizer and seed being contained in separate hoppers or receptacles, which are provided with means for automatically delivering the necessary amount of said fertilizer and seed, and depositing them in furrows automatically opened in advance by the implement as it moves along and afterward covered and rolled down. Moreover, the implement is provided with devices for readily controlling the amount of both seed and fertilizer delivered in a given time, and for adjusting the size of the delivery openings to fertilizer and seed of a great many varieties.

Referring to the accompanying drawings, Figure 1 is a side elevation of an implement embodying my invention. Fig. 2 is a central longitudinal section in the plane of $y\,y$, Fig. 4. Fig. 3 is a transverse section in the plane of $x\,x$, Fig. 2. Fig. 4 is a plan view. Fig. 5 is a rear view of the seed-containing hopper and adjacent parts. Figs. 6, 7 and 8 show on a larger scale various shapes of regulating cam wheels employed to control the speed with which the seed is deposited, and Fig. 9 shows on a large scale how the delivery outlet of the seed hopper is adjusted.

A A are the side bars of the frame of the implement, and A' A' are the handles bolted thereto.

G G are the front wheels mounted on the axle rod $g$ which has bearings in the forward ends of the side bars A A, and M is a wheel or roller mounted between the rear ends of said side bars.

B is the fertilizer hopper which is provided with the lugs $b^5$ by which the hopper is bolted to the side bars A A.

C is the seed hopper mounted in the rear of the fertilizer hopper, being secured to the side bars through the connecting pieces $C^2$, or in any desired manner.

The two hoppers B and C are nearly centrally mounted in the frame in line with each other, and are provided with covers B' and C', respectively.

E is a spindle rod passing longitudinally through the hoppers B and C near the bottoms thereof, and having bearings in the sides of the hoppers. On this spindle are fixed in each hopper the devices for agitating the fertilizer, and the seed, and for sifting each through the opening in the bottom of the hopper. The forward end of the spindle rod E has fixed thereon the bevel gear F which meshes with a bevel gear $F^2$ on the axle $g$. The gears F $F^2$ are covered by a protecting casing F'.

$F^3$ is a handle pivoted at $f^3$ and operating a clutch (not shown) of any approved construction whereby the bevel gear $F^2$ may be made to revolve with the axle $g$, or ride loosely thereon as desired, according to the position of the handle $F^3$. When thrown out of gear so that the bevel $F^2$ rides loose, the implement may be moved along on its wheels without turning the spindle rod E. When in gear, *i. e.*, with the bevel $F^2$ fixed to turn with the spindle $g$, the spindle E will revolve continuously as the implement is moved forward and will actuate the sifting and agitating mechanism presently to be described, but will allow the implement to be moved backward without actuating said mechanism. The sides of the hopper B slope inward at the bottom as shown in Fig. 3, the bottom being curved to form nearly a semi-cylinder, with the spindle rod E in the center thereof. E' is a worm or spiral blade fixed on the spindle E, and so shaped as to revolve almost in contact with the inner walls of the curved bottom of the hopper. This worm E' moves through the fertilizer contained in the bottom of the hopper and sifts it down through the central opening $b^3$ which serves as the outlet. The worm E' is a double spiral, the two halves working in opposite directions both pushing the material over the outlet, but alternately. Directly over the outlet a cam $e^6$ revolves to act as a crusher for all lumps larger than the average size of opening, when they lodge over the opening.

$B^2$ $B^2$ are two inclined feed plates mounted loosely on the spindle rod $b$ which has its bearings in the sides of the hopper B.

$b'$ is a stop fixed on the spindle $b$ to turn therewith the bottom of which stop bears against both plates $B^2$ as shown in Figs. 1 and 3. The rear end of the spindle rod $b$ outside the hopper is bent at right angles as shown at $b^4$, and rests in a cam slot $p'$ in the cam P. This cam is pivoted at $p$ to the outside of the hopper and has a handle rod P' pivotally connected thereto. This handle rod passes through a guiding eye $p^2$ in the side of one of the handles A' of the implement and preferably has a ring $P^2$ on the upper end thereof within easy reach of the operator. The construction is such that as the cam P is moved back and forth by the handle, the end $b^4$ moves in the cam slot $p'$ and acts as a crank to turn the spindle rod $b$ slightly. The stop $b'$ moves with the spindle and thus determines the position of the plates $B^2$ angularly, the feed plates when in position indicated by the full lines in Fig. 3 being open to allow the fertilizer to drop from the top to the bottom of the hopper, and when in the dotted position being closed. Thus when the handle P' is in the position shown in Fig. 1 with the end $b^4$ of the spindle rod at the forward end of the cam slot $p'$ the plates $B^2$ will normally rest in the angular position indicated by the full lines in Fig. 3 with an opening $b^6$ at the bottom between the plate and the inner wall of the hopper. When, however, the rod P is pressed inward so that the end $b^4$ of the spindle rod is at the rear end of the cam slot $p'$ then both plates $B^2$ will be held in the position indicated by dotted lines in Fig. 3, the plates being pressed upward (as the spindle rod $b$ turns) by the bearing of the stop $b'$ against said plates in a manner readily apparent without further description.

Each plate $B^2$ has on the bottom thereof the lug $b^2$ and the worm E' has shoulders $e$, which at intervals in the revolution of the worm, strike against the lugs $b^2$ (when the cam P is in the position shown in Fig. 1), and cause first one and then the other of the two plates $B^2$ to vibrate back and forth through a small angle as shown in Fig. 3. This alternate vibration of the two plates $B^2$ prevents the fertilizer, which is contained in quantity in the upper part of the hopper and bears against the plates, from caking together, and serves to sift it down through the openings $b^6$ alternately opened into the bottom of the hopper where it is in a light condition to be acted on by the worm. The amount of oscillation of the plates $B^2$ governs the feed to the worm, which always operates best when just supplied with sufficient material to have it but partially covered. The amount of oscillation necessary therefore depends on the amount being sown, combined with the dryness of the material and consequent easy flow, and can be instantly and minutely adjusted by the rod and cam. The hopper B is open on the side, that the operator may watch the amount of fertilizer fed, over the worm and regulate the oscillation suitably.

The seed hopper C has its sides sloping inward near the bottom thereof, and has a rounded bottom with a central outlet opening $c^3$. The spindle E has fixed thereon the stirrer $E^2$ consisting of two pairs of paddles $e^2$ at right angles to each other, arranged to sweep along the sides and bottom of the recess in which they revolve. The paddles sweep toward the opening $c^3$ alternately, and their edges are set at an angle preferably of about forty-five degrees with the axle, those on opposite sides being at right angles to each other. These paddles are preferably made of soft elastic material such as rubber so as not to cut or crush the seed in sweeping it through the opening $c^3$. The paddles may, however, be made of metal if desired.

Both fertilizer and seed hoppers are provided with similar devices for regulating the flow of the fertilizer or seed through the hopper opening.

Referring to the fertilizer hopper, D is a flexible band stretched along the curved under surface of the hopper one end being secured to an end of the spring $D^6$, the other end of the spring being attached to the hopper or a connection thereof. The other end of the band is pivoted at $d'$ to one arm of a bell crank lever $D^2$ which is fulcrumed at $d^2$ to the hopper. D' is a rod pivoted to the other arm of the bell crank $D^2$ which rod passes up along one of the handle bars A' of the implement and through a gage frame $D^3$ fixed on said handle bar near the top thereof, the rod D' terminating preferably in the ring $D^5$ at the upper end. The strap D has an opening $d$ of the same size and shape as the outlet $b^3$ of the hopper. The amount of fertilizer which sifts through the outlet of the hopper is determined by the relative position of the two openings $b^3$ and $d$ which is obviously regulated by the position of the handle rod D'.

The construction and operation of the strap L on the seed hopper, with its opening $l$, its bell crank lever $L^2$ pivoted at $l^2$ to the seed hopper, the operating rod L' and the gage frame $L^3$ (presently to be explained) are identical with the corresponding parts, D, $d$, D', $D^2$, $D^3$, &c., so that a description of the regulating device on one hopper will suffice for that on the other.

Fig. 9 shows on an enlarged scale the seed hopper regulating device. The opening $l$ in the strap L corresponds in size and shape with the hopper opening $c^3$. The gage frame $L^3$ is fixed to the top surface of one of the handle bars A' and has the end flanges $l^6$ and $l^8$ through which the rod L' slides.

$L^4$ is a screw provided with a milled head $l^3$, being so mounted between the flanges $l^6$ and $l^8$ as to turn without moving lengthwise.

$l^7$ is an index having an interior screw thread engaging with the screw $L^4$ and adapted to move along the base plate $L^3$ of the gage frame as the screw is turned.

The rod $L'$ has fixed thereon a stop $l^4$, which with the index $l^7$, limits the motion of the rod $L'$ so that when the rod is pushed down so far that the stop $l^4$ touches the flange $l^6$, the opening $c^3$ is completely closed by the strap L and no seed can escape. The base plate is preferably graduated with lines or with points, or with the names of various seeds in such a manner that when the index $l^7$ is screwed opposite the name of any particular seed and the handle rod $L'$ pulled back till the stop $l^4$ thereon touches the said index, the actual outlet formed by the overlapping of the two openings $c^3$ and $l$ will be of the requisite size to deliver the proper quantity of the seed in question. This arrangement enables the operator instantly to start or cut off the flow of seed, and the stop causes it always to be open to exactly the place at which it has been set by the regulating thumb screw. In the case of the fertilizer regulating device the base plate $d^5$ is preferably graduated with numbers to indicate pounds and when the index $d^7$ is set opposite the number of pounds wanted, the outlet opening is of proper size. The position of the graduated regulating devices at the top of the handle bars is of great importance on account of the readiness with which they may be seen and manipulated by the operator.

H is a combined fertilizer channel and tooth standard bolted between the side bars A beneath the outlet opening $b^3$ of the fertilizer hopper.

H′ is a furrowing tooth having a slot whereby it can be secured to the standard H at various depths, being held by a thumb nut $h$ on a screw projecting from the standard.

$H^2$ $H^2$ are a pair of covering blades secured to the standard H and extending inward, and to the rear of the bottom of the channel H in such a manner as to cover the furrow as the implement advances as fast as the fertilizer is deposited. In like manner K′ is the seed furrowing tooth secured by a thumb nut $k$ to the combined standard and seed channel K, while $K^2$ are a pair of covering blades acting in a similar manner to the blades $H^2$ in covering the seed as fast as dropped. The fertilizer is preferably dropped continuously as the implement advances, being sifted through the outlet in the bottom of the hopper as already explained, and, running down the inclined channel H, drops directly into the furrow.

The devices in the seed hopper are so arranged that a quantity of the seed is dropped into the furrow either at regular intervals, or continuously, the intervals being subject to variation according to the kind of seed planted. To this end, the channel K which as cast is open at the bottom and rear, has the sliding shutter or cut off I, which when down closes the bottom of the channel and the rear thereof sufficiently to form a receptacle in which the seed gathers.

$i'$ $i'$ are two metal guiding strips fixed to the bottom of the shutter I one on each side and pivoted at $i$ to the sides of the channel. The top of the shutter I is secured to a sliding piece $E^4$ having the slot $e^3$ through which projects the spindle rod E which has mounted thereon the cam wheel $E^3$. The sliding piece $E^4$ is properly guided to move up and down, having suitable projections engaging with stops on the rear of the hopper C to limit the motion thereof. The piece $E^4$ has the projection $e'$ against which, as the spindle rod E revolves, the raised portions $e^4$ on the cam wheel $E^3$ are adapted to engage, each time raising the sliding piece $E^4$, which draws up the shutter I and makes an opening at the bottom of the channel K for the seed to escape. The result is that if there are three raised portions $e^4$ on the cam wheel $E^3$ the sliding piece $E^4$ and with it the shutter I will be raised and dropped three times during one revolution of the spindle rod E, thus allowing at each opening of the shutter a small quantity of the seed which has gathered in the bottom of the channel K since the previous opening of said shutter, to be dropped into the furrow.

I preferably provide the implement with a series of interchangeable cam wheels $E^3$ (see Figs. 6, 7 and 8) having a different number of raised portions $e^4$, each cam wheel being readily attached to or removed from the spindle rod E, so that a quantity of seed may be dropped two, three, four, six, or any number of times during a revolution of said spindle rod, causing the seed to fall at distances of twelve inches, eight inches, six inches, four inches, or other distances along the ground, the quantity being regulated through the gage frame $L^3$ in the manner already described. Continuous sowing is done simply by hooking up the spring cut off so that the hill dropping device is not operative.

In order to insure accuracy and evenness in planting, I provide the implement with a marker of peculiar construction the arm of which consists of a rod N preferably of wood pivoted at one end on a pin $n$, projecting obliquely upward and forward from the middle of a cross piece N′ bolted to each of the side bars A. The cross piece N′ has a number of curved pieces $n'$ cast thereon which serve as seats for the marker arm.

$N^2$ is the marker proper made of metal provided with the heavy marking end $n^7$ and having an eye $n^5$ at the upper end of a size to fit loosely on the arm N and to turn thereon as a pivot. The arm N is provided with a number of holes $n^4$ at regular distances along the same, $n^3$ being a screw adapted to engage with any one of said holes. The eye $n^5$ at the head of the marker is double to allow the screw $n^3$ to enter the arm between the two parts, and the recess $n^6$ is provided between the two eyes $n^5$, to allow the marker when secured on the arm at any one of the holes $n^4$ by the screw $n^3$, to be turned on one side or the other of the arm, while the arm may be turned on the pivotal pin $n$ to one side or the other of the implement.

I claim—

1. In a combined seed planter and fertilizer dropper a wheel mounted frame in combination with a fertilizer hopper, a seed hopper, a spindle rod E passing through both of said hoppers, directly operated by the implement wheels, and the worm fertilizer agitator E' having its two halves working in opposite directions and seed stirrer $E^2$, consisting of two pairs of paddles $e^2$ actuated by the same spindle rod, within said hopper, substantially as described.

2. In a fertilizer or seed dropper, a wheel mounted frame in combination with a hopper, an automatically operated spindle rod passing through said hopper, and the double spiral feed worm E' mounted on said spindle rod, and a cam $e^6$, substantially as and for the purposes described.

3. In a fertilizer dropper, a wheel mounted frame in combination with a hopper, an automatically operated spindle rod passing through said hopper, feed plates pivoted within said hopper, and a worm mounted on said spindle, and engaging with said plates, substantially as and for the purposes described.

4. In a fertilizer dropper, a hopper provided with a revoluble feed worm in combination with vibratory feed plates and mechanism for actuating said worm and plates, substantially as described.

5. In a fertilizer dropper, a hopper provided with vibratory feed plates, $B^2$, $B^2$ having the lugs $b^2$, in combination with a cam, P, arranged to control the motion of said feed plates and a handle rod, P', actuating said cam, substantially as described.

6. In a seed planter, a wheel mounted frame in combination with a stationary hopper, a spindle rod passing through said hopper, and directly and automatically operated by the driving wheels, and a stirrer $E^2$ consisting of two pairs of paddles $e^2$ fixed on said spindle rod, substantially as described.

7. In a planter, a stationary hopper in combination with a flexible sliding band provided with an opening corresponding to the hopper outlet, a spring tension at one end of said band, a bell crank lever, and a sliding operating handle rod, substantially as described.

8. In a planter, a stationary hopper, a sliding discharge-regulating band, a graduated plate, and a handle rod having suitable connection with said band and provided with an index engaging with said plate, substantially as described.

9. In a planter provided with handle bars a graduated seed or fertilizer index plate at the top of the handle bar in combination with discharge-regulating mechanism, an operating rod and a regulating index traversing said plates, substantially as described.

10. In a planter, a stationary flanged graduated plate in combination with discharge regulating mechanism, a sliding operating rod provided with stops, and a thumb screw provided with an index, substantially as described.

11. In a planter, a receptacle in combination with a movable convex spring shutter closing the mouth of said receptacle and a revoluble toothed cam wheel engaging with said shutter whereby the shutter is automatically opened at proper intervals, substantially as described.

12. In a planter, a receptacle in combination with a movable spring shutter closing the mouth of said receptacle, a revoluble spindle, a detachable cam wheel engaging with said shutter when mounted on said spindle and means for holding said shutter in an open position, whereby the implement is readily convertible from hill sowing to continuous sowing and vice versa, substantially as described.

In witness whereof I have hereunto set my hand.

SAML. L. ALLEN.

Witnesses:
EDWARD W. BURT,
CHAS. WAINWRIGHT.